US012151345B2

(12) United States Patent
Noiseux et al.

(10) Patent No.: US 12,151,345 B2
(45) Date of Patent: Nov. 26, 2024

(54) TOOLING SYSTEM AND METHODS OF ASSEMBLING AND DISASSEMBLING A ROTARY ASSEMBLY THEREWITH

(71) Applicant: PRATT & WHITNEY CANADA CORP., Longueuil (CA)

(72) Inventors: Danny Noiseux, Longueuil (CA); Pierre-Luc Lachance, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 381 days.

(21) Appl. No.: 17/746,197

(22) Filed: May 17, 2022

(65) Prior Publication Data

US 2023/0373069 A1 Nov. 23, 2023

(51) Int. Cl.
*B25B 27/02* (2006.01)
*B25B 11/02* (2006.01)
*F01D 25/28* (2006.01)

(52) U.S. Cl.
CPC .............. *B25B 27/02* (2013.01); *B25B 11/02* (2013.01); *F01D 25/28* (2013.01); *F05D 2230/60* (2013.01); *F05D 2230/70* (2013.01); *F05D 2240/60* (2013.01); *F05D 2260/37* (2013.01)

(58) Field of Classification Search
CPC ......... B25B 27/02; B25B 27/14; B25B 11/02; F05D 2260/37
See application file for complete search history.

(56) References Cited

U.S. PATENT DOCUMENTS

| | | | |
|---|---|---|---|
| 4,567,649 A | 2/1986 | Ades et al. | |
| 6,536,088 B1 | 3/2003 | Chiang | |
| 8,683,670 B2 | 4/2014 | Thomas | |
| 2010/0095499 A1 | 4/2010 | Hung | |

FOREIGN PATENT DOCUMENTS

| | | | |
|---|---|---|---|
| CN | 109623728 | 4/2019 | |
| KR | 101257474 B1 * | 4/2013 | ............ B23P 19/027 |

OTHER PUBLICATIONS

Machine Translation of KR 10-1257474 B1 (Year: 2013).*

* cited by examiner

*Primary Examiner* — Christopher J. Besler
(74) *Attorney, Agent, or Firm* — Norton Rose Fulbright Canada LLP

(57) ABSTRACT

The tooling system can have an extension unit having a pushing member and a pulling member extending along a length, the pushing member and the pulling member in sliding engagement and displaceable relative to one another, the extension unit having an internal passage configured for receiving a portion of the shaft via the first end; a pushing adapter engageable with and disengageable from the pushing member at the first end, and further engageable with and disengageable from one of the shaft and the component; and a pulling adapter engageable with and disengageable from the pulling member at the first end, and further engageable with and disengageable from an other one of the shaft and the component.

12 Claims, 8 Drawing Sheets

TOOLING SYSTEM AND METHODS OF ASSEMBLING AND DISASSEMBLING A ROTARY ASSEMBLY THEREWITH

TECHNICAL FIELD

The disclosure relates generally to aircraft engines and, more particularly, to tooling for use in the assembly or disassembly of rotating assemblies of aircraft engines.

BACKGROUND OF THE ART

Some aircraft engines have rotating assemblies including a plurality of components mounted to a shaft. Some or all of the components can be close fitting or interference fitting and require mechanical pushing force during assembly or mechanical pulling force for disassembly. Particular challenges can arise in situations where the shaft has an elongated portion extending away from the assembly location of a given component in the direction of engagement.

SUMMARY

In one aspect, there is provided a tooling system for assembling or disassembling a rotating assembly of an aircraft engine, the rotating assembly including a shaft and a component adapted to be mounted thereto: an extension unit having a length extending between a first end and a second end, the extension unit having a pushing member and a pulling member extending along the length, the pushing member and the pulling member in sliding engagement and displaceable relative to one another along the length, the extension unit having an internal passage extending along the length, the internal passage configured for receiving a portion of the shaft via the first end; a pushing adapter engageable with and disengageable from the pushing member at the first end, and further engageable with and disengageable from one of the shaft and the component for transferring a pushing force received by the pushing member at the second end to the one of the shaft and the component; and a pulling adapter engageable with and disengageable from the pulling member at the first end, and further engageable with and disengageable from an other one of the shaft and the component for transferring a pulling force received by the pulling member at the second end to the other one of the shaft and the component.

In another aspect, there is provided a method of assembling a plurality of components to a shaft of an aircraft engine with a tooling system having an extension unit extending from a first end to a second end and having a pushing member slidably engaged with a pulling member, and a plurality of adapters, the method comprising: assembling a first component of the plurality of components to the shaft of the aircraft engine, including the pushing member pushing the first component via a first adapter of the plurality of adapters while the pulling member pulls the shaft via a second adapter of the plurality of adapters; disengaging the first adapter and the second adapter from the first end of the extension unit; engaging a third adapter of the plurality of adapters and a fourth adapter of the plurality of adapters with the first end of the extension unit; and assembling a second component of the plurality of components to the shaft of the aircraft engine, including the pushing member pushing the second component via the third adapter while the pulling member pulls the shaft via the fourth adapter.

In a further aspect, there is provided a method of disassembling a plurality of components from a shaft of an aircraft engine with a tooling system having an extension unit extending from a first end to a second end and having a pushing member slidably engaged with a pulling member, and a plurality of adapters, the method comprising: disassembling a first component of the plurality of components from the shaft of the aircraft engine, including the pulling member pulling the first component via a first adapter of the plurality of adapters while the pushing member pushes the shaft via a second adapter of the plurality of adapters; disengaging the first adapter and the second adapter from the first end of the extension unit; engaging a third adapter of the plurality of adapters and a fourth adapter of the plurality of adapters with the first end of the extension unit; and disassembling a second component of the plurality of components from the shaft of the aircraft engine, including the pulling member pulling the second component via the third adapter while the pushing member pushes the shaft via the fourth adapter.

DESCRIPTION OF THE DRAWINGS

Reference is now made to the accompanying figures in which.

DETAILED DESCRIPTION

Figure 1:
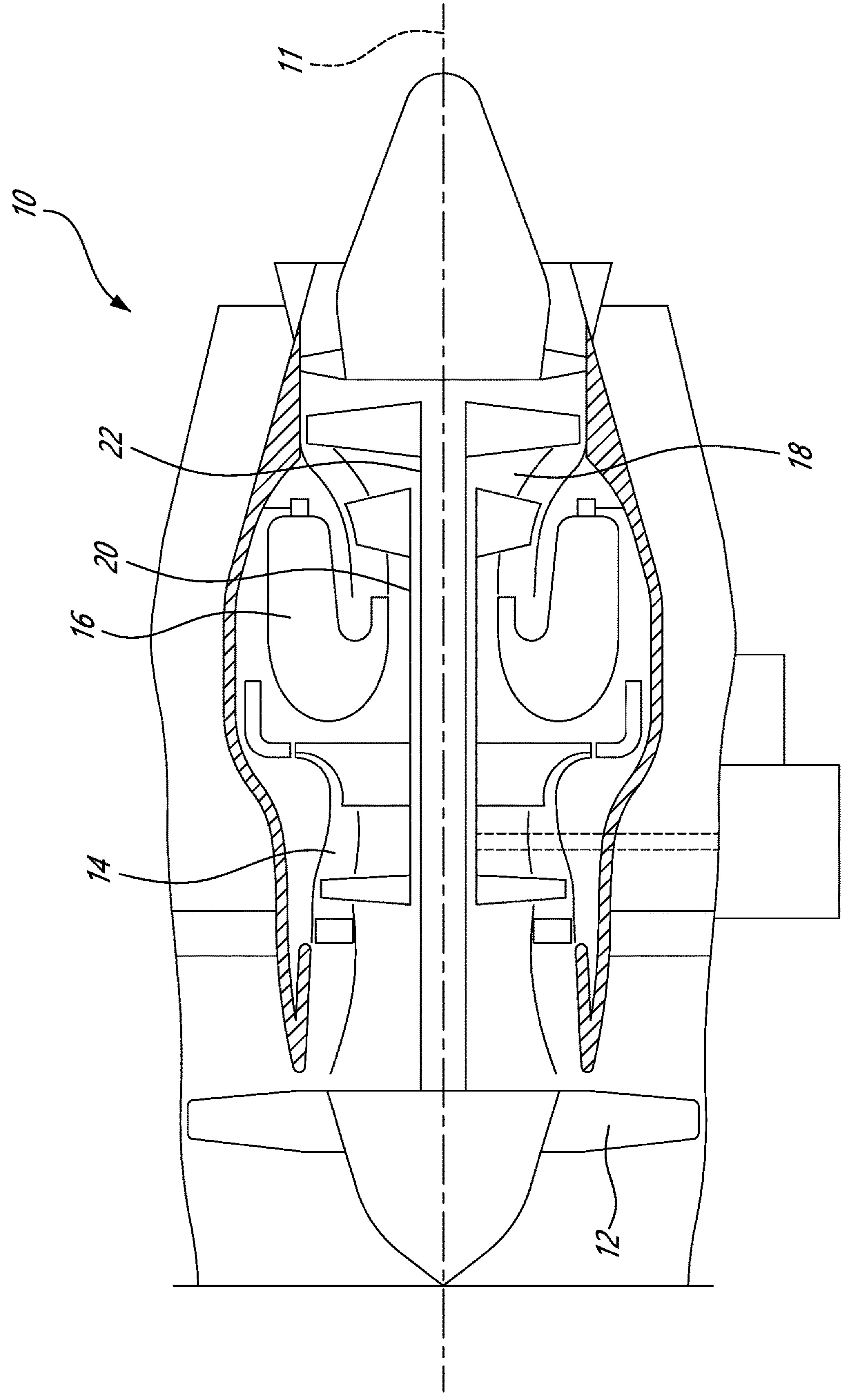
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases. Various other types of aircraft engines exist such as turboprop engines, turboshaft engines, electric engines, hybrid fuel/electric engines, etc.

Some aircraft engines have rotating assemblies. For instance, gas turbine engine 10 has a low pressure spool 22 and a high pressure spool 20, both of which may be assembled from a plurality of components and constitute rotating assemblies.

Figure 2:
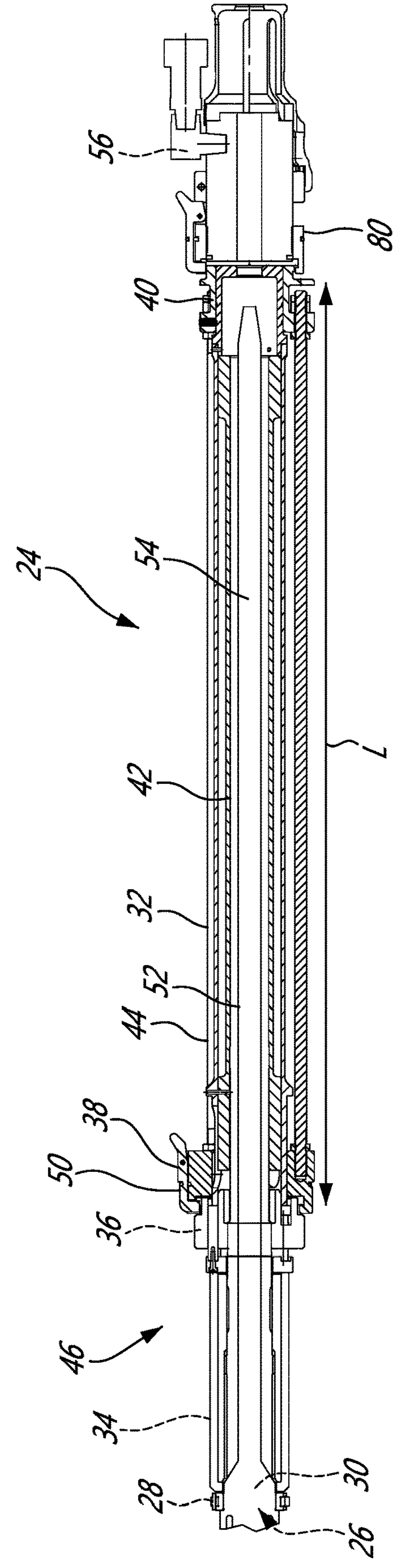
FIG. 2 is a cross-section view of a tooling system, of a component, and of a shaft of a rotating assembly.

FIG. 2 illustrates a tooling system 24 and a rotating assembly 26. The rotating assembly 26 including a component 28 and a shaft 30. The tooling system 24 can be configured for assembling the component 28 to the shaft 30 (i.e. assembling the rotating assembly 26), for disassembling the component 28 from the shaft 30 (i.e. disassembling the rotating assembly 26) or both. The tooling system 24 includes an extension unit 32, a pushing adapter 34, and a pulling adapter 36. The extension unit 32 has a length L extending between a first end 38 and a second end 40. The extension unit 32 has a pushing member 42 and a pulling member 44. The pushing member 42 and the pulling member 44 are in sliding engagement, and can be displaced relative to one another, in the orientation of the length L, via the sliding engagement. The pushing adapter 34 is engageable with and disengageable from the pushing member 42 at the first end 38, and the pulling adapter 36 is engageable with and disengageable from the pulling member 44 at the first end 38.

In this embodiment, the pushing adapter 34 and the pulling adapter 36 are in sliding engagement with one another and form an adapter unit 46 which is engaged with the extension unit 32 via a quick connect interface 50, but other configurations are possible in alternate embodiments. For instance, in one alternate embodiment, the pushing adapter 34 and the pulling adapter 36 can be engaged with and disengaged from the first end 38 separately, one at a time. In another alternate embodiment, one or both of the pushing adapter 34 and the pulling adapter 36 can be secured at the first end 38 with fasteners. In some embodiments, the pushing adapter 34 can be engaged with the pushing member 42 simply by abutment. The extension unit 32, the pushing adapter 34 and the pulling adapter 36 have an internal passage 52 open at the first end 38 and configured for receiving a portion 54 of the shaft 30 therein via the first end 38. More specifically, in this embodiment, the sliding engagement is internal to the pulling adapter 36. In this embodiment, the extension unit 32 is configured for engagement with a force effector 56, such as a hydraulic system, at the second end 40.

FIG. 2 illustrates the tooling system 24 in an assembly configuration, during assembly of the component 28 to the shaft 30, at an assembly location on the shaft 30. More specifically, the force effector 56 is configured to exert opposing mechanical forces to the pushing member 42 and to the pulling member 44, such that the pulling member 44 operates in tension and the pushing member 42 operates in compression during the assembly step. The tooling system 24 transfers these opposing mechanical forces to the shaft 30 and to the component 28, to force the component 28 into its assembly location against the mechanical resistance of the shaft 30. More specifically, during the assembly step, the pushing member 42 pushes the component 28 via the pushing adapter 34 while the pulling member 44 pulls the shaft 30 via the pulling adapter 36. In a disassembly step, these roles are reversed, and the pushing member 42 pushes the shaft 30 via the pushing adapter 34, while the pulling member 36 pulls the component 28 via the pulling adapter 36.

A given rotating assembly 26 can have a plurality of components 28 which need to be assembled to or disassembled from the shaft 30, and each component 28 can have a particular configuration, size and shape, to which the tooling system 24 is to adapt. When the portion 54 of the shaft 30 which exceeds the assembly location is long, the internal passage 52, and thus the tooling system 24, can be adapted by being long as well. In one embodiment which is not shown, different tooling units can be provided for different components or different functions (assembly or disassembly of a given component). In situations where such tooling units are long, the tooling units can be relatively expensive to manufacture and can be inconvenient to handle during use and store when not in use.

Figure 3:
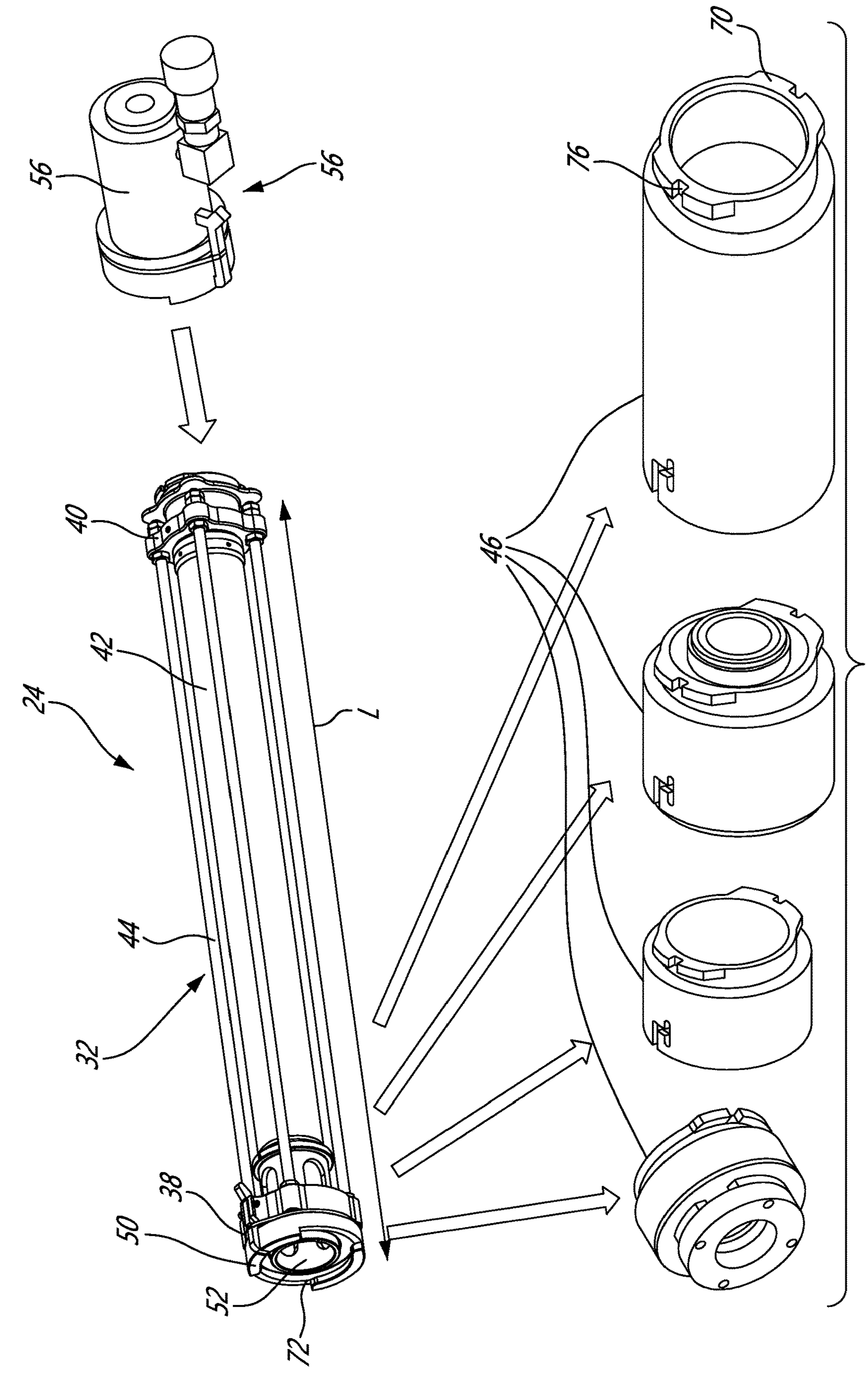
FIG. 3 is an exploded view of the tooling system of FIG. 2.

FIG. 3 presents an exploded view of the tooling system 24. As shown in FIG. 3, the tooling system 24 can include a plurality of adapter units 46, with each adapter unit 46 having a specific combination of pushing adapter 34 and pulling adapter 36, each specific combination being adapted to a specific component 30 and specific task (e.g. assembly or disassembly) to be performed on that specific component 30. The adapter units 46 can be significantly shorter than the extension unit 32, such as less than ⅔, less than ½, less than ⅓, or less than ¼ of the length L of the extension unit. The extension unit 32 can be made universal, in the sense that it can be configured to be used to reach over a significant portion of the length of the shaft 30, independently of which step is being performed, and which corresponding adapter unit 46 is mounted to its first end 38. Accordingly, a single, somewhat bulky, extension unit 32 can be used for several tasks, simply by changing the shorter, less bulky, adapter unit 46 for each task. The adapter units 46, and extension unit 32, can be significantly more convenient to handle and to store when not in use than independent tooling units would otherwise be.

Figure 4A:
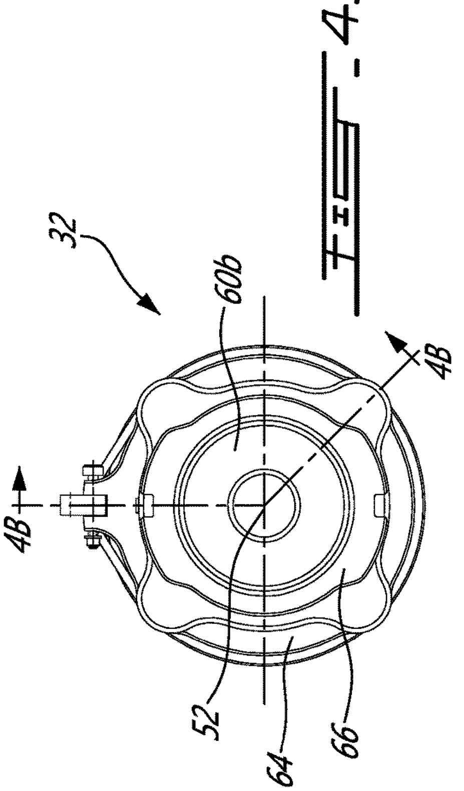
FIG. 4A is an axial elevation view of an extension unit of the tooling system of FIG. 2, showing a second end.
Figure 4B:
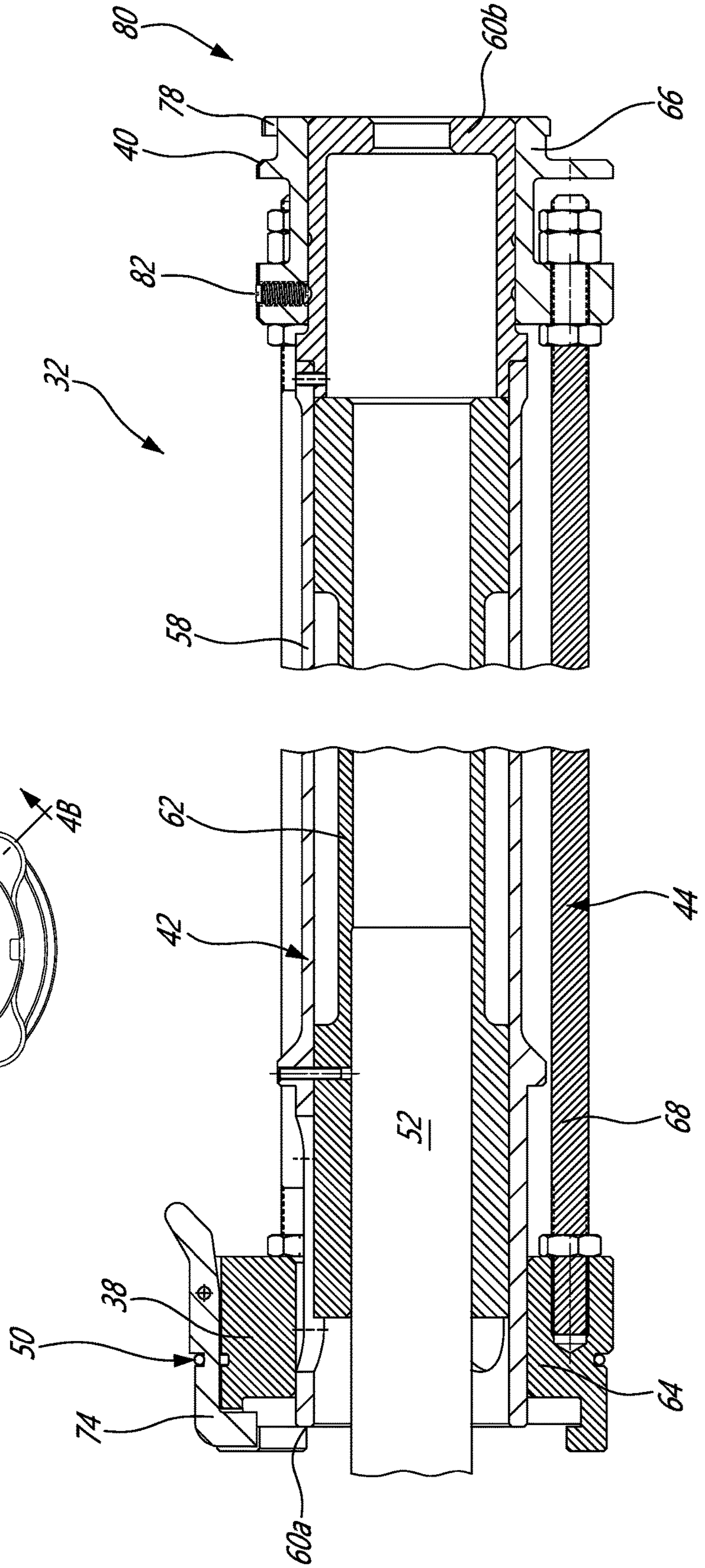
FIG. 4B is a cross-sectional view taken along lines 4B-4B of FIG. 4A.

Turning now to FIGS. 4A and 4B, an example embodiment of an extension unit 32 will now be presented in greater detail. In this example embodiment, the pulling member 44 is external to the pushing member 42. More specifically, the pushing member 42 has a tubular body 58 extending between abutment faces 60*a*, 60*b* located at the first end 38 and at the second end 40. The abutment face 60*a* at the first end 38 can be configured for engaging a corresponding abutment face of the pushing adapter 34, whereas the abutment face 60*b* at the second end 40 can be configured for engaging a corresponding abutment face of the force effector 56. Abutment faces configured for engaging one another can be said to form an abutment interface in this specification. Alternately, one or both of the ends of the pushing member 42 can be secured to (as opposed to simply in abutment with) the corresponding one of the pushing adapter 34 and force effector 56. In this embodiment, the tubular body 58 is made of metal such as steel and is configured for compression resistance between the two ends 38, 40. In this embodiment, the tubular body 58 is lined with a plastic lining 62. The plastic lining 62 can receive the shaft 30 in sliding engagement therewith in a smooth sliding engagement and thus delimit the internal passage 52 along a portion, or the entirety, of the length L of the extension unit 32. The plastic lining 62 is optional. In this embodiment, rather than by being provided in the form of a single tubular body 58, the pulling member 44 is provided with a first guide member 64 at the first end 38, and a second guide member 66 at the second end 40. The guide members 64, 66 being interconnected to one another by a plurality of rods 68. The rods 68 can be circumferentially interspaced around the internal passage 52. The rods 68 can be threadingly engaged with the first guide member 64 and second guide member 66. The rods 68 can be adapted to provide tension resistance between the two guide members 64, 66. The guide members 64, 66 can be provided with a lengthwise opening in which corresponding ends of the pushing member 42 are slidingly engaged, thereby providing smooth sliding relative displacement ability between the pushing member 42 and the pulling member 44. While the pushing member 42 can in some embodiments be configured to transfer compressive force by simple abutting engagement, the transfer of tension force by the pulling member 44 can be achieved by holding the components in the chain of pulling force to one another.

Figure 5B:
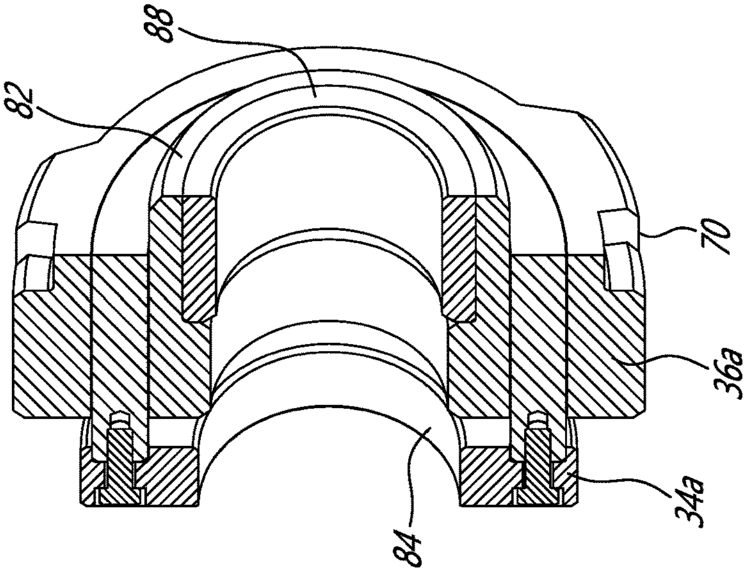
FIG. 5B is an oblique cross-sectional view of the assembly adapter unit of FIG. 5A.

In the illustrated embodiment, the holding of the pulling adapter 36 is achieved with a quick connect interface 50. More specifically, the pulling adapter 36 can be provided with a male member 70 such as shown in FIGS. 3 and 5B, whereas first end 38 of the pulling member 36 can be provided with a female member 72 such as also shown in FIG. 3. In this embodiment, the quick connect interface 50 involves axially engaging radially protruding tabs of the male member 70 into corresponding slots of the female member 72, and then rotating the tabs of the male member 70 into circumferentially extending grooves of the female member 72. A spring-biased hook 74 provided at the first end 38 of the pulling member 44 can snap into a radially oriented groove 76 formed in a tab of the male member 70, when the pulling adapter 36 reaches the circumferential position of engagement, and the male member 70 can thence remain trapped until the hook 74 is disengaged and the components are rotated and then pulled apart in a reverse sequence of steps. The quick connect interface 50 can be configured for capturing or releasing the pulling adapter 36 with or from the extension unit 32. If the pulling adapter 36 and the pushing adapter 34 are integrated to one another as an adapter unit 46, the quick connect interface 50 can be configured for capturing or releasing the adapter unit 46 with or from the extension unit 32.

In the illustrated embodiment, the second end 40 of the extension unit 32 is provided with a male member 78 of a quick connect interface 80 similar to the male member 70 of the pulling adapters 36, and the force effector 56 can have a female member similar to the female member 72 at the first end 38 of the extension unit 32, in a manner that the second end 40 of the extension unit 32 can be engaged with the force effector 56 in a manner similar to the way the pulling adapter 36 is engaged with the first end 38 of the extension unit 32. Various alternate embodiments are possible. For instance, in some embodiments, the pulling member 44 can be secured to the pulling adapter 36 and/or to the force effector 56 via fasteners or otherwise mechanically secured thereto in a manner to allow the transfer of pulling force between the second end 40 of the extension unit 32 and the pulling adapter 36. Moreover, in this embodiment, a ball plunger 82 extends radially across the second guide member 66 to the pushing member 42, and the pushing member 42 is provided with annular grooves. This can allow the pushing member 42 to remain somewhat lengthwisely trapped within the pulling member 44 in the absence of an excessive mechanical force. The force effector 56 can be a hydraulic system for instance. The adapter units 46 can be adapted to be securable directly to the force effector 56 or indirectly, via the extension unit 32.

Figure 5A:
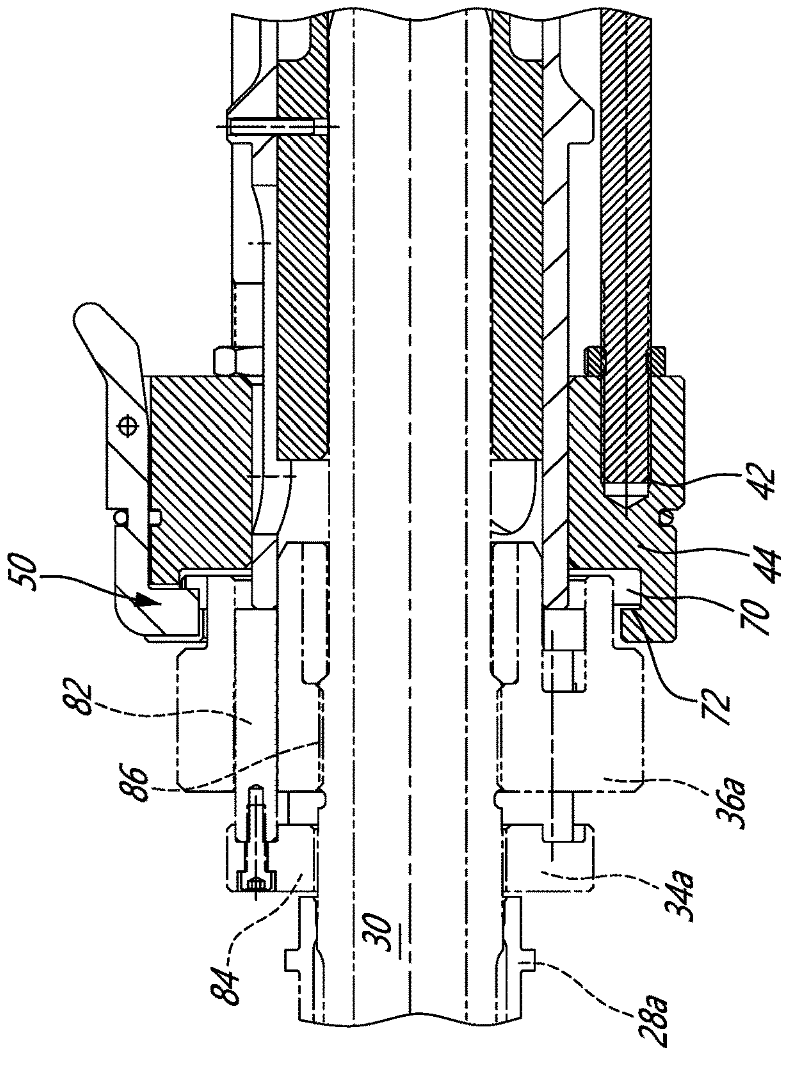
FIG. 5A is another cross-sectional view showing the first end of the extension unit with a first assembly adapter unit for a first component.

FIG. 5A presents an example embodiment corresponding to a first task. The first task consists in assembling a first component 28*a* to the shaft 30. A first pushing adapter 34*a* is shown abuttingly engaged between the pushing member 42 and the component 28*a*. More specifically, the first pushing adapter 34*a* has a tubular member 82 abutting the pushing member 42 at a proximal end and terminated by a radially inwardly projecting ledge 84 at the distal end. The radially inwardly projecting ledge 84 abuts against a proximal end of the component 28*a*. A first pulling adapter 36*a* is shown engaged to the pulling member 44 at a proximal end, via the quick connect interface 50. The first pulling adapter 36*a* has a female thread 86 which is threadingly secured to a corresponding male thread of the shaft 30. Accordingly, during the assembly operation, the shaft 30 can be pulled back via the thread engagement, the pulling adapter 36*a*, the quick connect interface 50, and the pulling member 44, while the component 28*a* is pushed forward by the abutting engagement with the pushing adapter 34*a*, and the abutting engagement between the pushing adapter 34*a* and the pushing member 42. During the assembly operation, the pushing adapter 34*a* transfers a pushing force received from the pushing member 42 to the component 28*a*, and the pulling adapter 36*a* transfers a pulling force received from the pulling member 44 to the shaft 30.

As best seen in FIG. 5B, in this embodiment, since the pulling member 44 is external to the pushing member 42, and the component 28*a* is farther away than the thread engagement, the pushing adapter 34*a* crosses/intersects the pulling adapter 36*a*. More specifically, the pulling adapter 36*a* has a lengthwisely oriented annular opening in which the tubular member 82 of the pushing adapter 34*a* is slidingly engaged in a manner to provide for sliding relative movement between the pulling adapter 36*a* and the pushing adapter 34*a* in the lengthwise orientation. The annular opening can be said to form a guiding aperture and the tubular member 82 can be said to form a guiding member. In alternate embodiments, pulling adapters can have one or more guiding apertures in which a corresponding one or more guiding member of the pushing adapter is slidingly engaged. The pulling adapter and the pushing adapter can be trapped together and form an adapter unit, or can be manually separable from one another, depending on the embodiment. It will also be noted in this embodiment that the pulling adapter 36*a* has a plastic liner 88 offering a smooth sliding engagement with the shaft 30 and also delimiting the internal passage 52.

Figure 6:
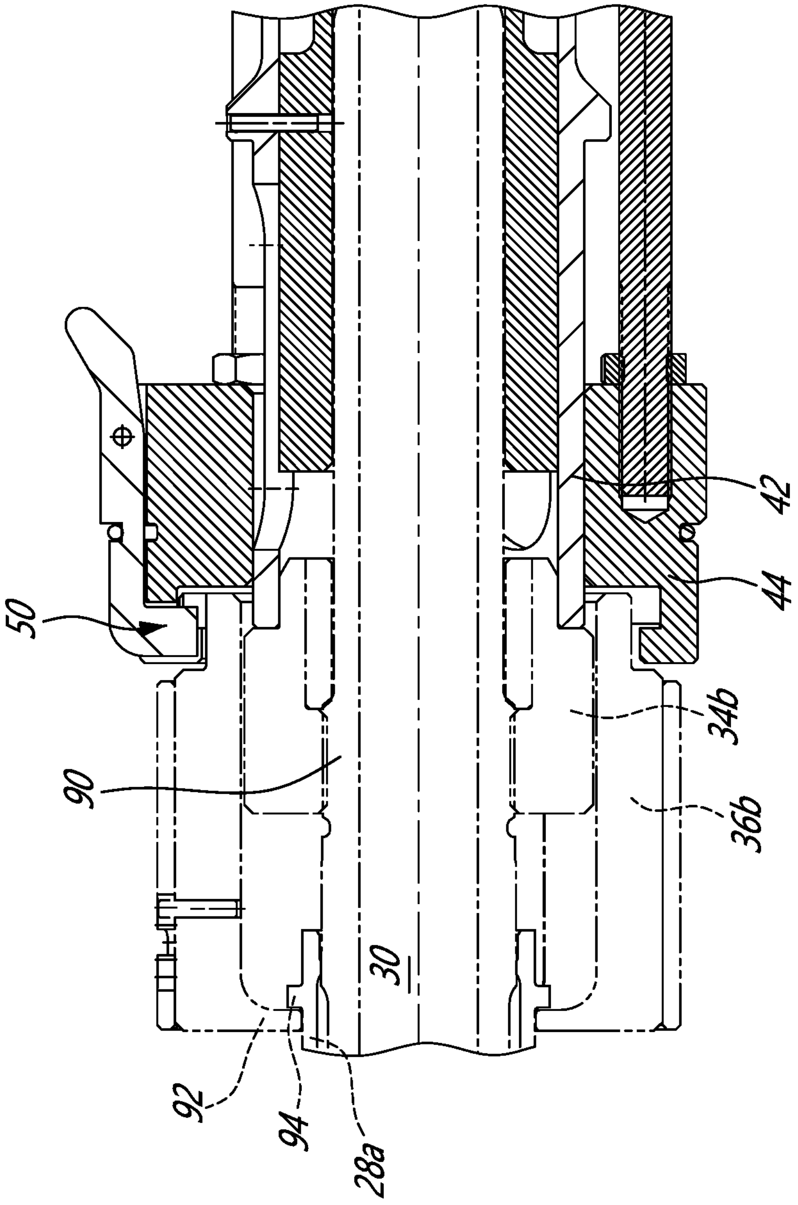
FIG. 6 is another cross-sectional view showing the first end of the extension unit with a first disassembly adapter unit for the first component.

FIG. 6 presents an example embodiment corresponding to a second task. The second task consists in removing the first component 28*a* from the shaft 30. A second pushing adapter 34*b* is shown abuttingly engaged with the pushing member 42 and threadingly engaged with the shaft 30. More specifically, the second pushing adapter 34*b* has a tubular member abutting the pushing member 42 at a proximal end and has a female thread 90 at the distal end. The shaft 30 has a corresponding male thread which can receive the female thread 90 to form a rigid connection in the lengthwise orientation. A second pulling adapter 36*b* is shown engaged to the pulling member 44 at a proximal end, via the quick connect interface 50. The second pulling adapter 36*b* has radially inwardly projecting ledge 92 which is abuttingly engaged behind a corresponding radially outwardly oriented ledge 94 on the component. Accordingly, during the disassembly operation, the shaft 30 can be pushed via the thread engagement, the pushing adapter 34*b*, and the abutment between the pushing adapter 34*b* and the pushing member 42, whereas the component 28*a* can be simultaneously pulled by the pulling adapter 36*b* and the pulling member 44 via the quick connect interface 50. In this embodiment, the pushing adapter 34*b* and the pulling adapter 36*b* can be manually engaged with one another by inserting the pushing adapter 34*b* into an internal passage formed in the pulling adapter 36*b*, or manually separated from one another. During the disassembly operation, the pushing adapter 34*b* transfers a pushing force received from the pushing member 42 to the shaft 30, and the pulling adapter 36*b* transfers a pulling force received from the pulling member 44 to the component 28*a*.

Figure 7:
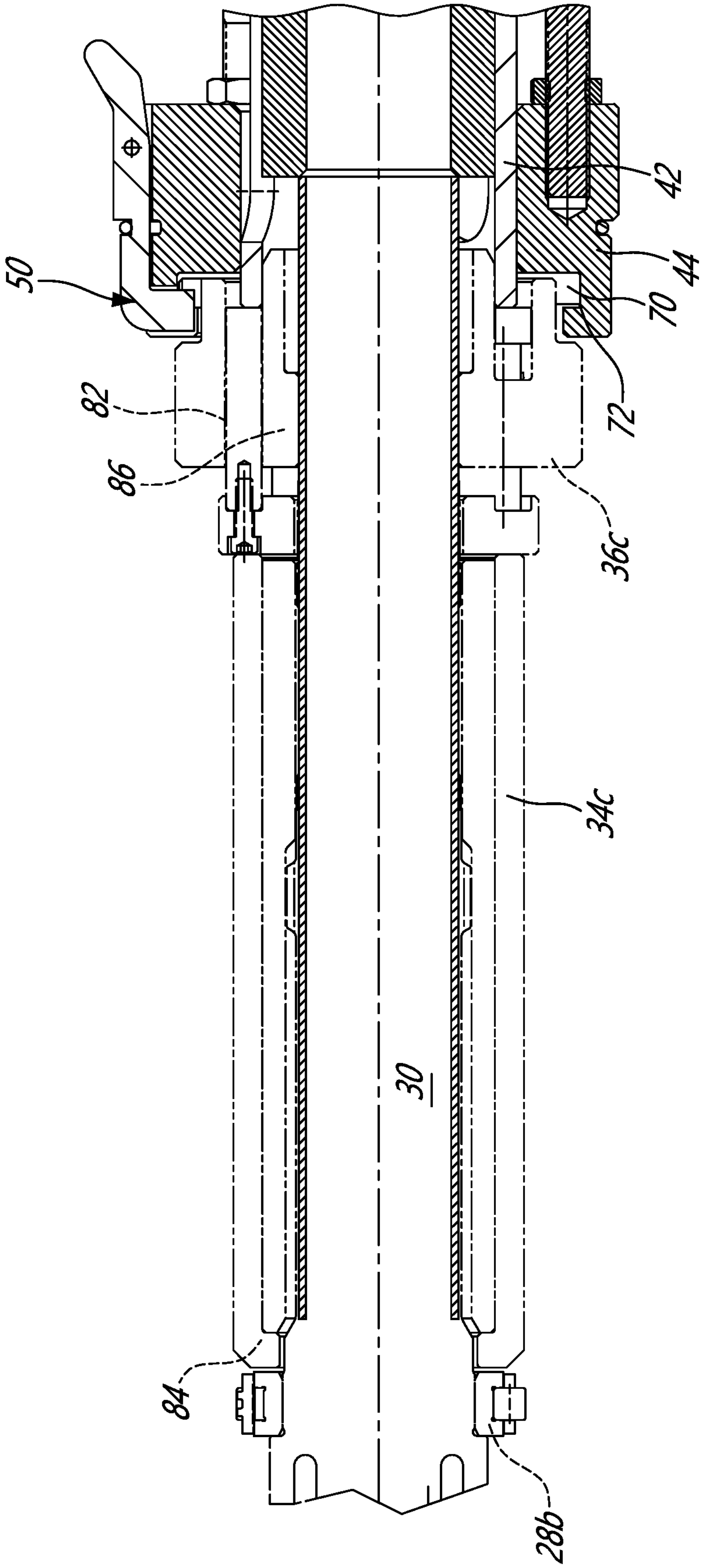
FIG. 7 is another cross-sectional view showing the first end of the extension unit with a second assembly adapter unit for a second component.

FIG. 7 presents an example embodiment corresponding to a third task. The third task consists in assembling a second component 28*b* to the shaft 30. A third pushing adapter 34*c* is shown abuttingly engaged between the pushing member 42 and the component 28*a*. More specifically, the third pushing adapter 34*c* has a tubular member 82 abutting the pushing member 42 at a proximal end and terminated by a radially inwardly projecting ledge 84 at the distal end. The radially inwardly projecting ledge 84 abuts against a proximal end of the component 28*b*. A third pulling adapter 36*c* is shown engaged to the pulling member 44 at a proximal end, via the quick connect interface 50. The third pulling adapter 46*a* has a female thread 86 which is threadingly secured to a corresponding male thread of the shaft 30. Accordingly, during the assembly operation, the shaft 30 can be pulled back via the thread engagement, the pulling adapter 36*c*, the quick connect interface 50, and the pulling member 44, while the component 28*b* is pushed forward by the abutting engagement with the pushing adapter 34*c*, and the abutting engagement between the pushing adapter 34*c* and the pushing member 42. During the assembly operation, the pushing adapter 34*c* transfers a pushing force received from the pushing member 42 to the component 28*b*, and the pulling adapter 36*c* transfers a pulling force received from the pulling member 44 to the shaft 30.

Figure 8:
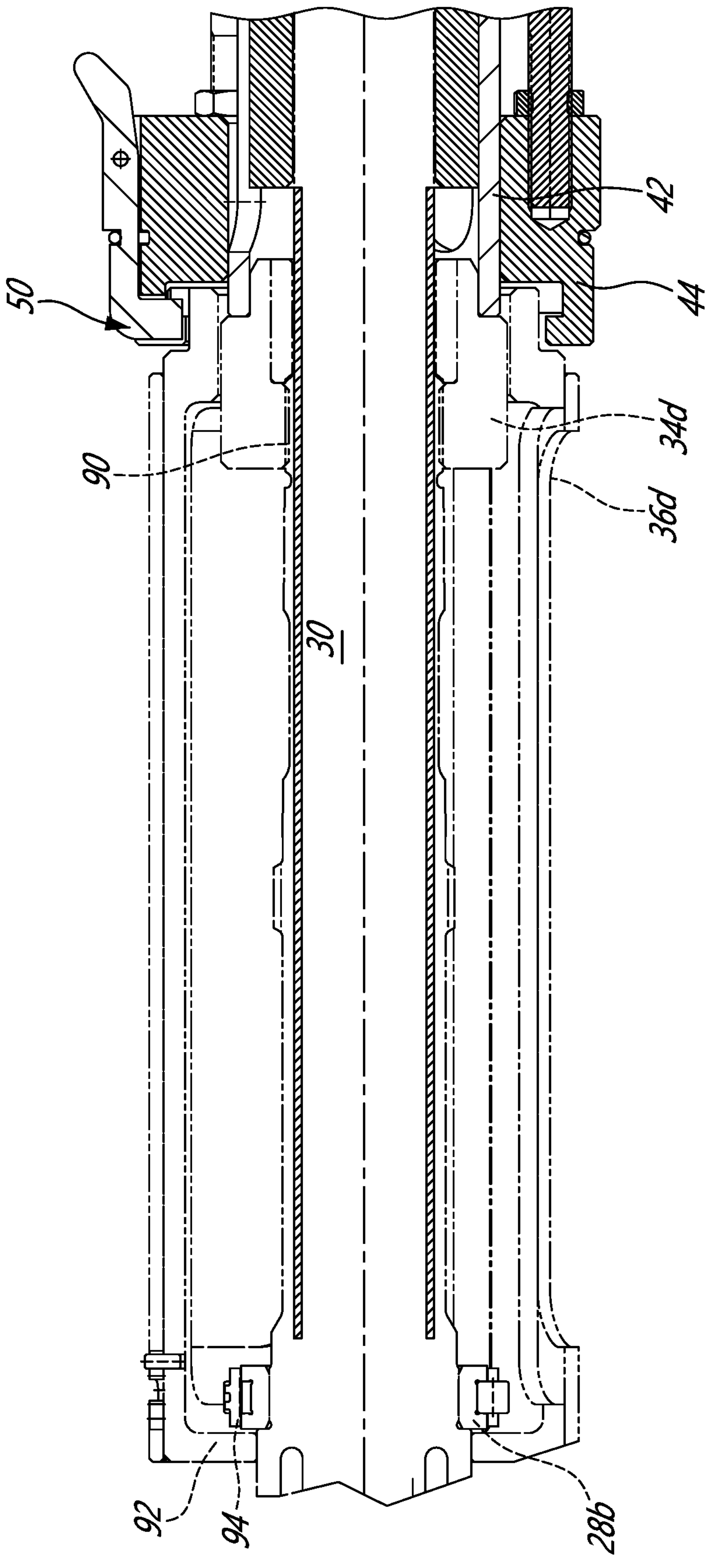
FIG. 8 is another cross-sectional view showing the first end of the extension unit with a second disassembly adapter unit for a second component.

FIG. 8 presents an example embodiment corresponding to a fourth task. The fourth task consists in removing the second component 28*b* from the shaft 30. A fourth pushing adapter 34*d* is shown abuttingly engaged with the pushing member 42 and threadingly engaged with the shaft 30. More specifically, the fourth pushing adapter 34*d* has a tubular member abutting the pushing member 42 at a proximal end and has a female thread 90 at the distal end. The shaft 30 has a corresponding male thread which can receive the female thread 90 to form a rigid connection in the lengthwise orientation. A fourth pulling adapter 36*d* is shown engaged to the pulling member 44 at a proximal end, via the quick connect interface 50. The fourth pulling adapter 36*d* has radially inwardly projecting ledge 92 which is abuttingly engaged behind a corresponding radially outwardly oriented ledge 94 on the component. Accordingly, during the disassembly operation, the shaft 30 can be pushed via the thread engagement, the pushing adapter 34*d*, and the abutment between the pushing adapter 34*d* and the pushing member 42, whereas the component 28*b* can be simultaneously pulled by the pulling adapter 36*d* and the pulling member 44 via the quick connect interface 50. In this embodiment, the pushing adapter 34*d* and the pulling adapter 36*d* can be manually engaged with one another by inserting the pushing adapter 34*d* into an internal passage formed in the pulling adapter 36*d*, or manually separated from one another. During the disassembly operation, the pushing adapter 34*d* transfers a pushing force received from the pushing member 42 to the shaft 30, and the pulling adapter 36*d* transfers a pulling force received from the pulling member 44 to the component 28*b*.

Accordingly, it will be understood that the component can be one of a plurality of components of a given rotating assembly, and the tooling system can include a plurality of adapters. The plurality of adapters can be configured for engaging different ones of the components, and/or configured for engaging the same ones of the components differently in the assembly and in the disassembly operation.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while using a hydraulic system as the force effector may be suitable in some embodiments, other types of force effectors may be preferred in other embodiments. In one embodiment, the force effector can be a threaded engagement or an endless screw type of force effector instead of a hydraulic force effector for instance, or any other suitable force effector. Moreover, different rotating assemblies will have a different number and configurations of parts, and a tooling system can have more or less pushing and/or pulling adapters depending on the particularities of the rotating assemblies. Moreover, a tooling system can have pushing and/or pulling adapters adapted to more than one type of rotating assembly. It will be understood that any alternative suitable mechanical arrangement that can pull can be used instead of the combination of rods in the pulling member, such as a tubular cylinder. In some embodiments, it can be preferred to incorporate a holding feature to facilitate manipulation. Moreover, a quick connect interface can be pneumatic clamping instead of mechanical, for instance. The pulling member can be internal to the pushing member. Yet further modifications could be implemented by a person of ordinary skill in the art in view of the present disclosure, which modifications would be within the scope of the present technology.

The invention claimed is:

1. A tooling system for assembling or disassembling a rotating assembly of an aircraft engine, the rotating assembly including a shaft and a component adapted to be mounted thereto, the tooling system comprising:

an extension unit having a length extending between a first end and a second end, the extension unit having a pushing member and a pulling member extending along the length, the pushing member and the pulling member in sliding engagement and displaceable relative to one another along the length, the extension unit having an internal passage extending along the length, the internal passage configured for receiving a portion of the shaft via the first end;

a pushing adapter engageable with and disengageable from the pushing member at the first end, and further engageable with and disengageable from one of the shaft and the component for transferring a pushing force received by the pushing member at the second end to the one of the shaft and the component; and a pulling adapter engageable with and disengageable from the pulling member at the first end, and further engageable with and disengageable from an other one of the shaft and the component for transferring a pulling force received by the pulling member at the second end to the other one of the shaft and the component.

2. The tooling system of claim 1 wherein the component is one of a plurality of components and at least one of the pushing adapter and the pulling adapter is one of a plurality of adapters, wherein different ones of the plurality of adapters are configured for engaging different ones of the plurality of components.

3. The tooling system of claim 1 wherein the tooling system is configured for both assembling the component to the shaft and disassembling the component from the shaft, the pushing adapter is a first pushing adapter, the pulling adapter is a first pulling adapter, the tooling system further including a second pushing adapter and a second pulling adapter, the first pushing adapter and the second pulling adapter being engageable and disengageable from the shaft, and the second pushing adapter and the first pulling adapter being engageable and disengageable from the component.

4. The tooling system of claim 1 wherein the pulling adapter is engageable with and disengageable from the pulling member via a quick connect interface, the quick connect interface configured for capturing or releasing the pulling adapter with or from the extension unit.

5. The tooling system of claim 4 wherein the pushing adapter is engageable with and disengageable from the pushing member via an abutment interface.

6. The tooling system of claim 1 wherein the pushing adapter and the pulling adapter are in sliding engagement and displaceable relative to one another along the length, and collectively form an adapter unit.

7. The tooling system of claim 6 wherein the pulling adapter has at least one guiding aperture oriented along the length, the pushing adapter has at least one guiding member slidingly engaged with and extending through the at least one guiding aperture.

8. The tooling system of claim 1 wherein one of the pulling adapter and the pushing adapter has a female thread and the shaft has a mating male thread, the one of the pulling adapter and the pushing adapter being engageable with and disengageable from the shaft via the female thread and male thread.

9. The tooling system of claim 1 wherein the pulling member is external to the pushing member.

10. The tooling system of claim 9 wherein the pushing member has a tubular body with a plastic lining, the plastic lining delimiting the internal passage.

11. The tooling system of claim 9 wherein the pulling member includes a first guide member at the first end, a second guide member at the second end, a plurality of rods interconnecting the first guide member and the second guide member, wherein the pushing adapter has tubular body slidingly engaged with the first guide member and the second guide member, the internal passage formed within the tubular body and the plurality of rods being external to the tubular body.

12. The tooling system of claim 1 wherein both the pushing adapter and the pulling adapter have less than ¼ of the length of the extension unit.

* * * * *